(12) United States Patent
Joseph et al.

(10) Patent No.: US 11,088,800 B2
(45) Date of Patent: Aug. 10, 2021

(54) AUTONOMOUS REFERENCE SIGNAL TRANSMISSION CONFIGURATION

(71) Applicant: QUALCOMM Incorporated, San Diego, CA (US)

(72) Inventors: Vinay Joseph, San Diego, CA (US); Rajat Prakash, San Diego, CA (US); Peerapol Tinnakornsrisuphap, San Diego, CA (US); Mostafa Khoshnevisan, San Diego, CA (US); Piyush Gupta, Bridgewater, NJ (US); Junyi Li, Chester, NJ (US); Farhad Meshkati, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 98 days.

(21) Appl. No.: 16/421,282

(22) Filed: May 23, 2019

(65) Prior Publication Data
US 2019/0372727 A1   Dec. 5, 2019

Related U.S. Application Data

(60) Provisional application No. 62/690,617, filed on Jun. 27, 2018, provisional application No. 62/678,699, filed on May 31, 2018.

(51) Int. Cl.
*H04L 5/00* (2006.01)
*H04W 72/04* (2009.01)
(Continued)

(52) U.S. Cl.
CPC ........... *H04L 5/005* (2013.01); *H04B 17/336* (2015.01); *H04L 1/0026* (2013.01);
(Continued)

(58) Field of Classification Search
None
See application file for complete search history.

(56) References Cited

U.S. PATENT DOCUMENTS

2009/0241004 A1\* 9/2009 Ahn .................. H04W 72/0406
714/749
2014/0204856 A1\* 7/2014 Chen .................... H04L 5/0053
370/329
(Continued)

OTHER PUBLICATIONS

International Search Report and Written Opinion—PCT/US2019/034000—ISA/EPO—dated Aug. 14, 2019.
(Continued)

*Primary Examiner* — Ayaz R Sheikh
*Assistant Examiner* — Faiyazkhan Ghafoerkhan
(74) *Attorney, Agent, or Firm* — Patterson + Sheridan LLP/Qualcomm Incorporated

(57) ABSTRACT

Certain aspects of the present disclosure provide techniques for autonomous reference signal transmission configuration. Certain aspects provide a method of receiving a configuration message from the base station, wherein the configuration message comprises an indication of a set of candidate resources for transmitting the reference signal. Certain aspects provide a method of detecting a future downlink transmission from the base station, and other aspects provide a method of transmitting, in response to detecting the future downlink transmission, the reference signal utilizing a first resource of the set of candidate resources prior to receiving the future downlink transmission via a second resource in the set of candidate resources.

30 Claims, 11 Drawing Sheets

(51) Int. Cl.
*H04L 25/02* (2006.01)
*H04L 27/26* (2006.01)
*H04B 17/336* (2015.01)
*H04W 76/27* (2018.01)
*H04W 72/14* (2009.01)
*H04L 1/00* (2006.01)

(52) U.S. Cl.
CPC ........ *H04L 5/0055* (2013.01); *H04L 25/0226* (2013.01); *H04L 27/2613* (2013.01); *H04W 72/042* (2013.01); *H04W 72/14* (2013.01); *H04W 76/27* (2018.02)

(56) References Cited

U.S. PATENT DOCUMENTS

| | | | | |
|---|---|---|---|---|
| 2015/0071233 | A1* | 3/2015 | Wang | H04L 5/0094 |
| | | | | 370/329 |
| 2016/0165580 | A1* | 6/2016 | Park | H04W 72/0413 |
| | | | | 370/329 |
| 2016/0242048 | A1* | 8/2016 | Pelletier | H04W 72/0413 |
| 2016/0381587 | A1* | 12/2016 | Alexey | H04W 24/04 |
| | | | | 370/329 |
| 2018/0139735 | A1* | 5/2018 | Akkarakaran | H04L 5/14 |
| 2018/0262244 | A1* | 9/2018 | Noh | H04L 5/0048 |
| 2018/0376371 | A1* | 12/2018 | Yang | H04W 28/065 |
| 2019/0215119 | A1* | 7/2019 | Kim | H04L 1/0027 |
| 2019/0320434 | A1* | 10/2019 | You | H04L 1/0009 |
| 2020/0008074 | A1* | 1/2020 | Yang | H04L 67/1044 |
| 2020/0204320 | A1* | 6/2020 | Yum | H04L 1/00 |

OTHER PUBLICATIONS

QUALCOMM Incorporated: "Considerations on New DCI Format", 3GPP TSG RAN WG1 Meeting #93, 3GPP Draft; R1-1807356 Considerations on New DCI Format for URLLC, 3rd Generation Partnership Project (3GPP), Mobile Competence Centre, 650, Route Des Lucioles ; F-06921 Sophia-Antipolis Cedex, France, vol. RAN WG1, No. Busan, Korea; May 21, 2018-May 25, 2018, May 12, 2018 (May 12, 2018), pp. 1-6, XP051463048, Retrieved from the Internet: URL: http://www.3gpp.org/ftp/tsg_ran/WG1_RL1/TSGR1_93/Docs/ [retrieved on May 12, 2018].

* cited by examiner

AUTONOMOUS REFERENCE SIGNAL TRANSMISSION CONFIGURATION

CROSS-REFERENCE TO RELATED APPLICATION

This application claims priority to and the benefit of U.S. Provisional Patent Application No. 62/678,699 filed on May 31, 2018, and U.S. Provisional Patent Application No. 62/690,617 filed on Jun. 27, 2018, the entire contents of which are incorporated herein by reference.

INTRODUCTION

Field of the Disclosure

Aspects of the present disclosure relate to wireless communications, and more particularly, to techniques for autonomous reference signal adaption and joint downlink control information (DCI) configuration.

DESCRIPTION OF RELATED ART

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipment (UE). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., which may be referred to as a base station, 5G NB, next generation NodeB (gNB or gNodeB), TRP, etc.). A base station or distributed unit may communicate with a set of UEs on downlink channels (e.g., for transmissions from a base station or to a UE) and uplink channels (e.g., for transmissions from a UE to a base station or distributed unit).

These multiple-access technologies have been adopted in various telecommunication standards to provide a common protocol that enables different wireless devices to communicate on a municipal, national, regional, and even global level. New Radio (NR) (e.g., 5G) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method of transmitting a reference signal to a base station. The method generally includes receiving a configuration message from the base station, wherein the configuration message comprises an indication of a set of candidate resources for transmitting the reference signal. The method also includes detecting a future downlink transmission from the base station, and transmitting, in response to detecting the future downlink transmission, the reference signal utilizing a first resource of the set of candidate resources prior to receiving the future downlink transmission via a second resource in the set of candidate resources.

Certain aspects provide a non-transitory computer readable storage medium that stores instructions that when executed by a user equipment (UE) cause the UE to perform a method of transmitting a reference signal from the UE to a base station. The method generally includes receiving a configuration message from the base station, wherein the configuration message comprises an indication of a set of candidate resources for transmitting the reference signal. The method also includes detecting a future downlink transmission from the base station, and transmitting, in response to detecting the future downlink transmission, the reference signal utilizing a first resource of the set of candidate resources prior to receiving the future downlink transmission via a second resource in the set of candidate resources.

Certain aspects provide a user equipment (UE) including a means for receiving a configuration message from a base station, wherein the configuration message comprises an indication of a set of candidate resources for transmitting a reference signal. The UE also includes means for detecting a future downlink transmission from the base station, and means for transmitting, in response to detecting the future downlink transmission, the reference signal utilizing a first resource of the set of candidate resources prior to receiving the future downlink transmission via a second resource in the set of candidate resources.

Certain aspects provide a user equipment (UE) including a memory and a processor communicatively coupled to the memory. The processor is generally configured to receive a configuration message from a base station, wherein the configuration message comprises an indication of a set of candidate resources for transmitting a reference signal. The processor is also configured to detect a future downlink transmission from the base station, and transmit, in response to detecting the future downlink transmission, the reference signal utilizing a first resource of the set of candidate resources prior to receiving the future downlink transmission via a second resource in the set of candidate resources.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
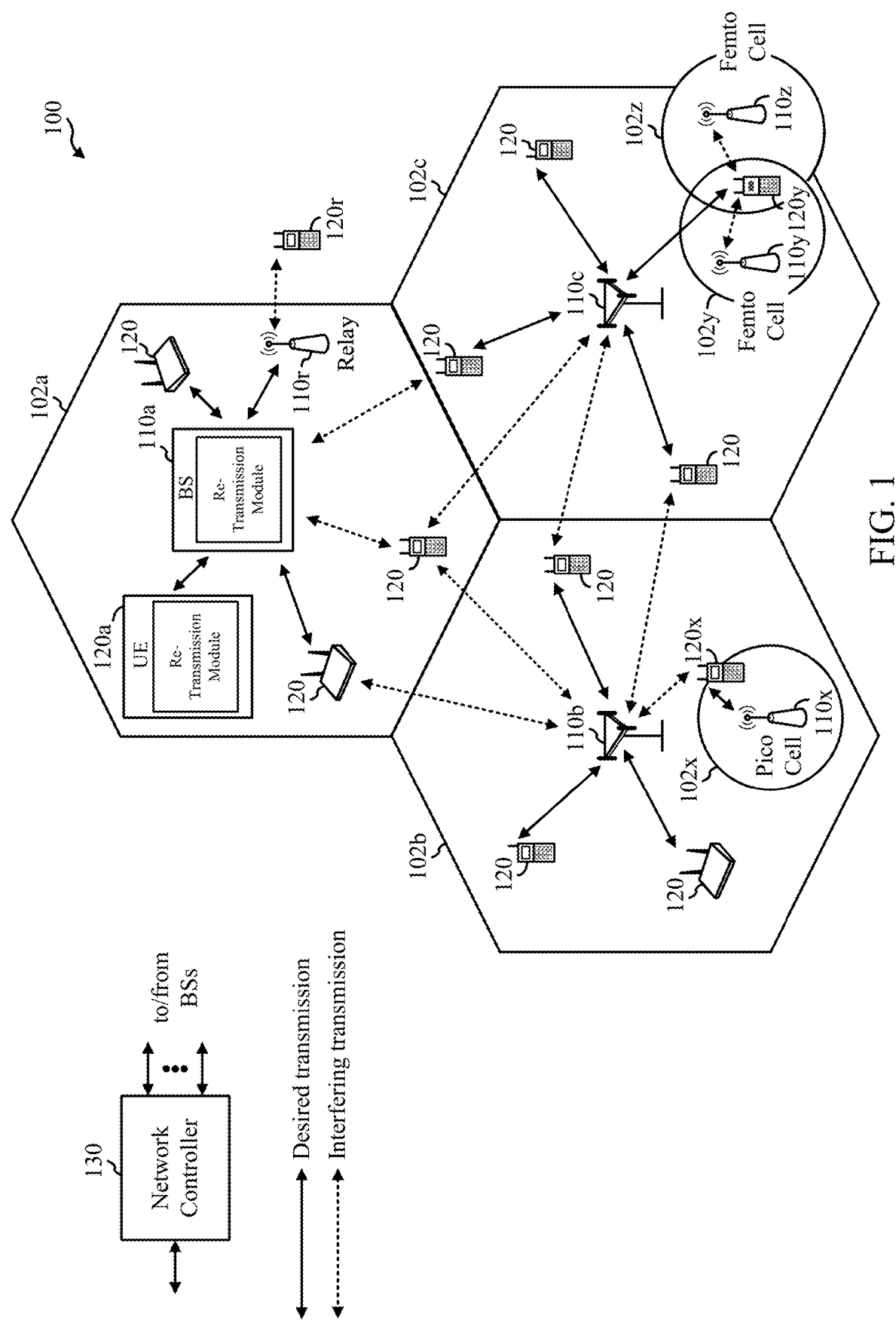
FIG. 1 is a block diagram conceptually illustrating an example telecommunications system, in accordance with certain aspects of the present disclosure.

Aspects of the present disclosure provide apparatus, methods, processing systems, and computer readable mediums for autonomous reference signal adaption, and more particularly to autonomous reference signal transmission configuration in response to a future (e.g., scheduled, upcoming, granted, etc.) downlink physical downlink shared channel (PDSCH) transmission (e.g., a change in coordinated scheduling (CS), semi-persistent scheduling (SPS), etc.), or a downlink communication error (e.g., error in decoding, loss of signal, etc.).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

FIG. 1 illustrates an example wireless communication network 100 in which aspects of the present disclosure may be performed. For example, the wireless communication network 100 may be a New Radio (NR) or 5G network. For example, as shown in FIG. 1, a user equipment (UE) 120a includes a re-transmission module that may be configured for generating and transmitting an autonomous reference signal, according to aspects described herein. This enables the UE 120a to rapidly transmit an aperiodic reference signal and/or an asynchronous channel state information (CSI) signal to a base station 110a without waiting for explicit instructions from the base station 110a after a downlink communication failure (e.g., decoding failure). In some configurations, the base station 110a includes a re-transmission module that may be configured for generating and transmitting an autonomous reference signal transmission configuration message to the UE 120a. In some examples, the configuration message provides a set of resources (e.g., resource blocks (RBs)) that the UE 120a can use to transmit the reference signal and/or CSI signal, according to aspects described herein. As described in more detail below, this pre-configuration of resources results in a relatively low latency re-transmission of downlink data. As illustrated in FIG. 1, the wireless network 100 may include a number of base stations 110 and other network entities. A base station may be a station that communicates with one or more user equipment (UE). Each base station 110 may provide communication coverage for a particular geographic area. In 3GPP, the term "cell" can refer to a coverage area of a Node B (NB) and/or a Node B subsystem serving this coverage area, depending on the context in which the term is used. In NR systems, the term "cell" and next generation NodeB (gNB), new radio base station (NR BS), 5G NB, access point (AP), or transmission reception point (TRP) may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network. As used herein, the term "base station" or "BS" can refer to any component (or collection of components) configured to provide wireless access to a network, such as transmit point (TP), TRP, an enhanced base station (eNodeB or eNB), a 5G base station (gNB), a macro base station, a femto base station, a Wi-Fi AP, or other wirelessly enabled devices. For example, a base station may include multiple TRPs configured to transmit different signals (e.g., carrying the same or different data) to a UE. Accordingly, a UE may be configured to receive multiple signals from multiple TRPs of a single base station.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A base station may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A base station for a macro cell may be referred to as a macro base station. A base station for a pico cell may be referred to as a pico base station. A base station for a femto cell may be referred to as a femto base station or a home base station. In the example shown in FIG. 1, the base stations 110a, 110b and 110c may be macro base stations for the macro cells 102a, 102b and 102c, respectively. The base station 110x may be a pico base station for a pico cell 102x. The base stations 110y and 110z may be femto base stations for the femto cells 102y and 102z, respectively. A base station may support one or multiple (e.g., three) cells.

Wireless communication network 100 may also include relay stations. A relay station is a station that receives a transmission of data and/or other information from an upstream station (e.g., a base station or a UE) and sends a transmission of the data and/or other information to a downstream station (e.g., a UE or a base station). A relay station may also be a UE that relays transmissions for other UEs. In the example shown in FIG. 1, a relay station 110r may communicate with the base station 110a and a UE 120r in order to facilitate communication between the base station 110a and the UE 120r. A relay station may also be referred to as a relay base station, a relay, etc.

Wireless network 100 may be a heterogeneous network that includes base stations of different types, e.g., macro base station, pico base station, femto base station, relays, etc. These different types of base stations may have different transmit power levels, different coverage areas, and different impact on interference in the wireless network 100. For example, macro base station may have a high transmit power level (e.g., 20 Watts) whereas pico base station, femto base station, and relays may have a lower transmit power level (e.g., 1 Watt).

Wireless communication network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for both synchronous and asynchronous operation.

A network controller 130 may couple to a set of base stations and provide coordination and control for these base stations. The network controller 130 may communicate with the base stations 110 via a backhaul. The base stations 110 may also communicate with one another (e.g., directly or indirectly) via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, factory automation equipment (e.g., robotic fabrication, assembly, finishing, etc.) or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled, wherein a scheduling entity (e.g., a base station) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving base station, which is a base station designated to serve the UE on the downlink and/or uplink. A finely dashed line with double arrows indicates interfering transmissions between a UE and a base station. In certain aspects, both a solid line with double arrows and a finely dashed line with double arrows indicate desired transmissions between a UE and one or more serving base station.

Figure 2:
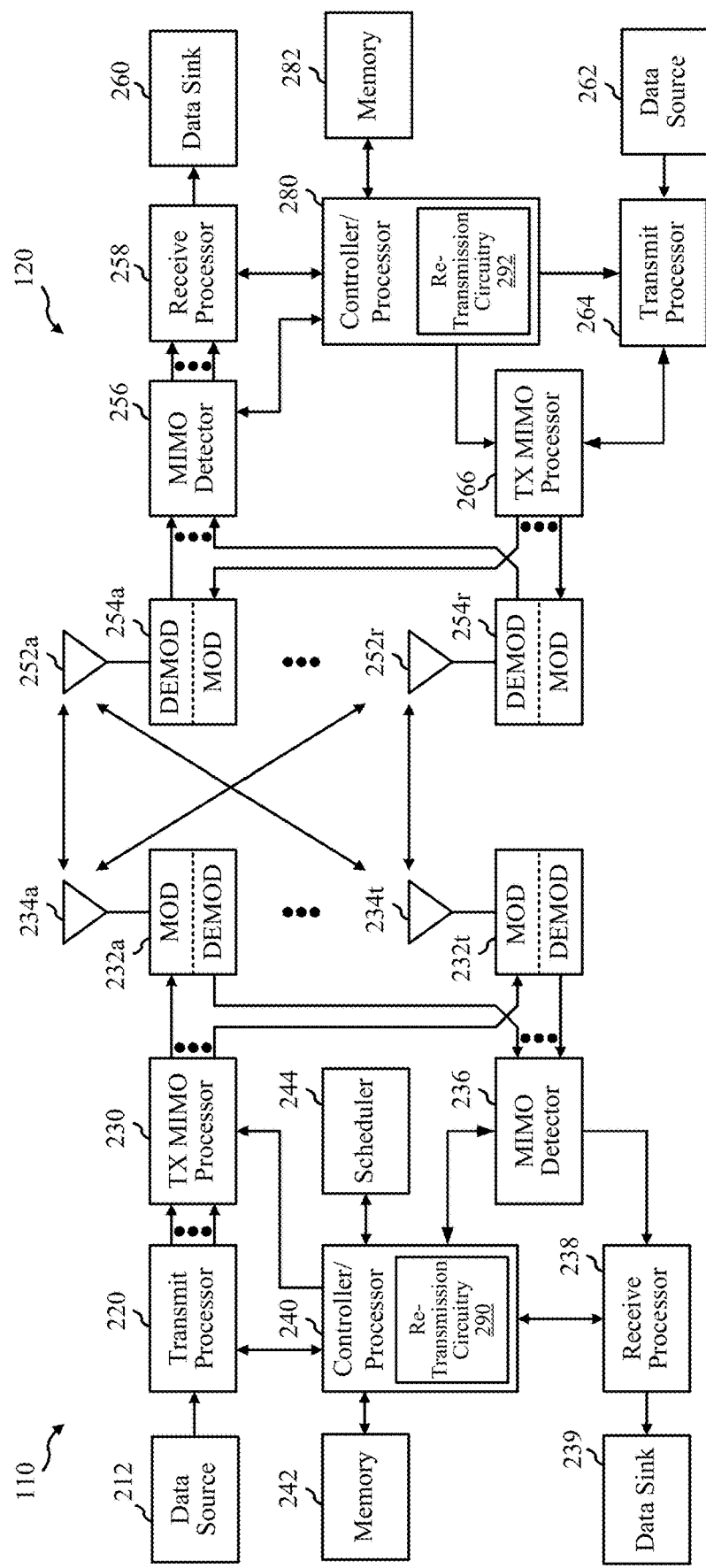
FIG. 2 is a block diagram conceptually illustrating a design of an example base station (BS) and user equipment (UE), in accordance with certain aspects of the present disclosure.

FIG. 2 illustrates example components of base station 110 and UE 120 (as depicted in FIG. 1), which may be used to implement aspects of the present disclosure. For example, antennas 252, processors 266, 258, 264, and/or controller/processor 280 of the UE 120 and/or antennas 234, processors 220, 230, 238, and/or controller/processor 240 of the base station 110 may be used to perform the various techniques and methods described herein.

At the base station 110, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The processor 220 may also generate reference symbols, e.g., for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 120, the antennas 252a through 252r may receive the downlink signals from the base station 110 and may provide received signals to the demodulators (DEMODs) in transceivers 254a through 254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 120 to a data sink 260, and provide decoded control information to a controller/processor 280.

On the uplink, at UE 120, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a through 254r (e.g., for SC-FDM, etc.), and transmitted to the base station 110. At the base station 110, the uplink signals from the UE 120 may be received by the antennas 234, processed by the modulators 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240.

The controllers/processors 240 and 280 may direct the operation at the base station 110 and the UE 120, respectively. The processor 240 and/or other processors and modules at the base station 110 may perform or direct the execution of processes for the techniques described herein. For example, controller/processor 240 and 280 may perform or direct operations and/or processes for the techniques described and illustrated in FIGS. 6-8. The memories 242 and 282 may store data and program codes for base station 110 and UE 120, respectively. A scheduler 244 may schedule UEs for data transmission on the downlink and/or uplink.

In some aspects of the disclosure, the controller/processor 240 of the base station 110 may include re-transmission circuitry 290 configured for various functions, including, for example, for receiving and processing an uplink communication from the UE 120 indicating that autonomous reference signal transmission is supported by the UE 120. In another example, re-transmission circuitry 290 is configured for generating and transmitting an autonomous reference signal transmission configuration message to the UE 120. For example, the re-transmission circuitry 290 may be configured to implement one or more of the functions described below in relation to FIG. 7.

In some aspects of the disclosure, the controller/processor 280 of the UE 120 may include re-transmission circuitry 292 configured for various functions, including, for example, detecting a future downlink transmission from a base station 110 and, in response, generating a reference signal for an uplink communication based on resources associated with the future downlink. In another example, re-transmission circuitry 292 is configured for transmitting the reference signal utilizing the uplink communication. For example, the re-transmission circuitry 292 may be configured to implement one or more of the functions described below in relation to FIGS. 7 and/or 8.

Figure 3:
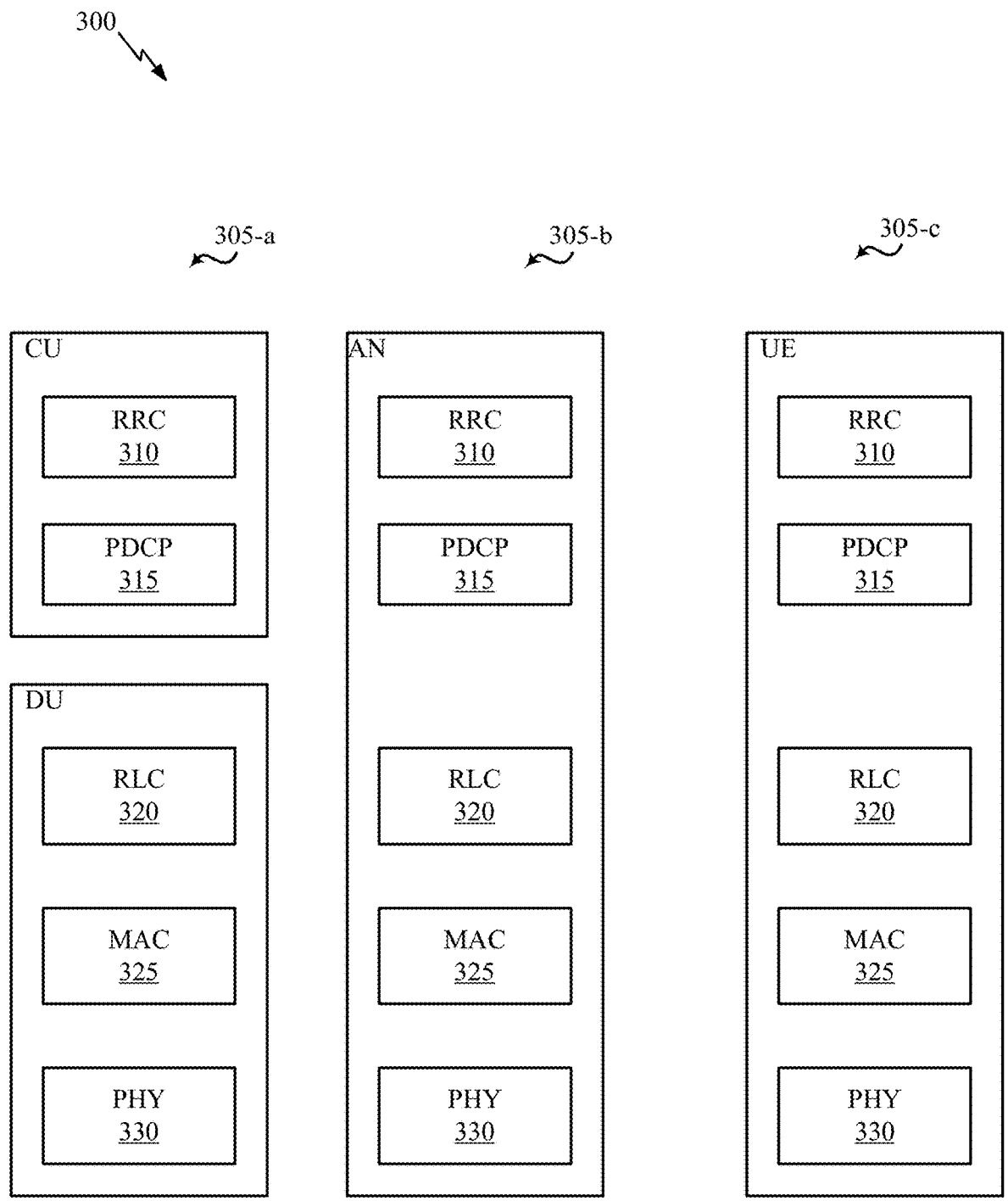
FIG. 3 is a diagram showing examples for implementing a communication protocol stack, in accordance with certain aspects of the present disclosure.

FIG. 3 illustrates a diagram 300 showing examples for implementing a communications protocol stack, according to aspects of the present disclosure. The illustrated communications protocol stacks may be implemented by devices operating in a wireless communication system, such as a 5G system (e.g., a system that supports uplink-based mobility). Diagram 300 illustrates a communications protocol stack including a Radio Resource Control (RRC) layer 310, a Packet Data Convergence Protocol (PDCP) layer 315, a Radio Link Control (RLC) layer 320, a Medium Access Control (MAC) layer 325, and a Physical (PHY) layer 330. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 305-a shows a split implementation of a protocol stack, in which implementation of the protocol stack is split between a centralized network access device and distributed network access device. It should be noted that that this is one example of a split implementation and the aspects of the present disclosure can be used with other split implementations (e.g., one such implementation involves a DU performing only some PHY layer functions and radio frequency functions and CU performing remaining functions including some PHY layer functions). In the first option 305-a, an RRC layer 310 and a PDCP layer 315 may be implemented by the central unit, and an RLC layer 320, a MAC layer 325, and a PHY layer 330 may be implemented by the DU. In various examples the CU and the DU may be collocated or non-collocated. The first option 305-a may be useful in a macro cell, micro cell, or pico cell deployment.

A second option 305-b shows a unified implementation of a protocol stack, in which the protocol stack is implemented in a single network access device. In the second option, RRC layer 310, PDCP layer 315, RLC layer 320, MAC layer 325, and PHY layer 330 may each be implemented by the AN. The second option 305-b may be useful in, for example, a femto cell deployment.

Regardless of whether a network access device implements part or all of a protocol stack, a UE may implement an entire protocol stack as shown in 305-c (e.g., the RRC layer 310, the PDCP layer 315, the RLC layer 320, the MAC layer 325, and the PHY layer 330).

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 4:
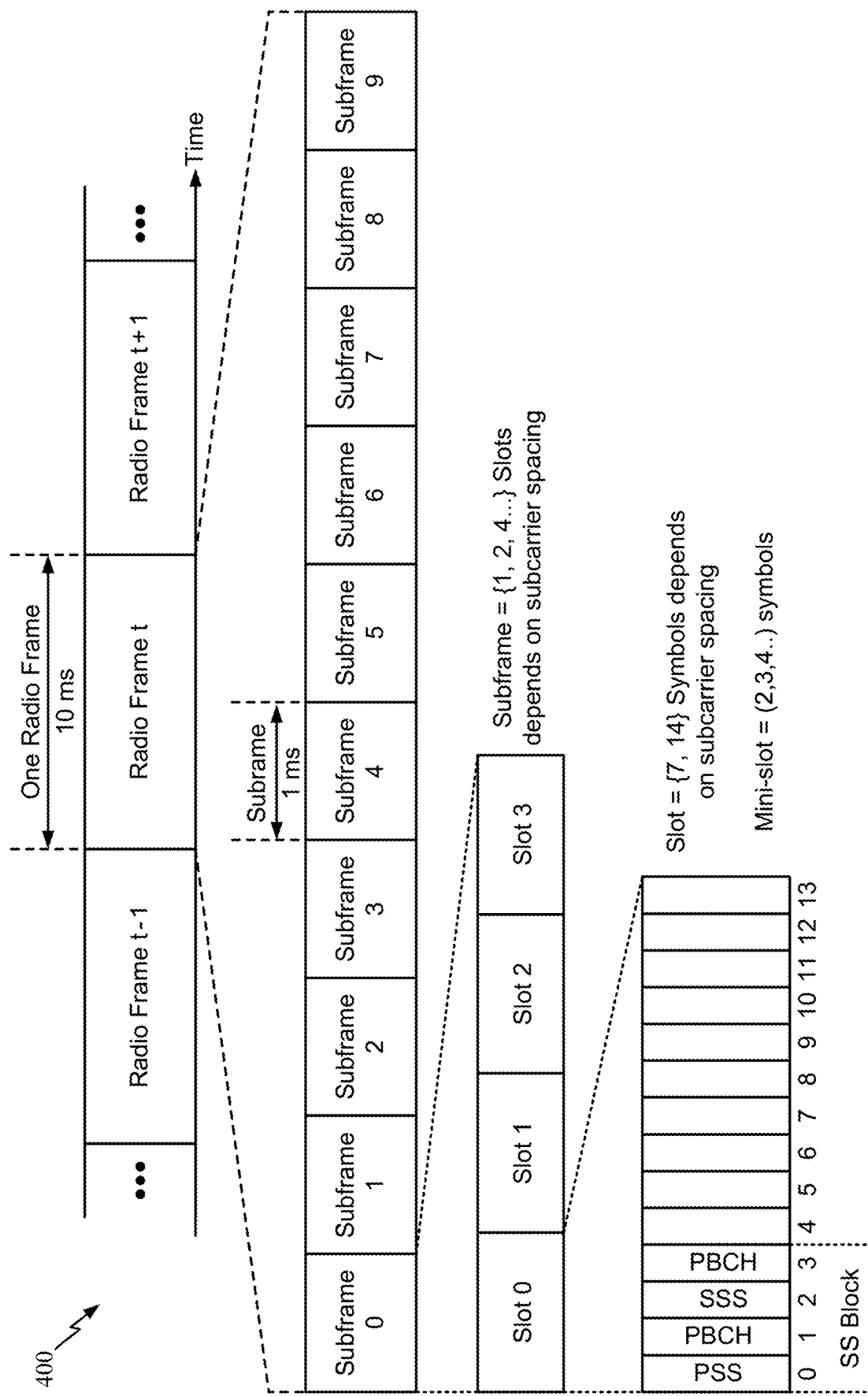
FIG. 4 illustrates an example of a frame format for a new radio (NR) system, in accordance with certain aspects of the present disclosure.

FIG. 4 is a diagram showing an example of a frame format 400 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot, which may be referred to as a sub-slot structure, refers to a transmit time interval having a duration less than a slot (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 4. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or base station), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Figure 5:
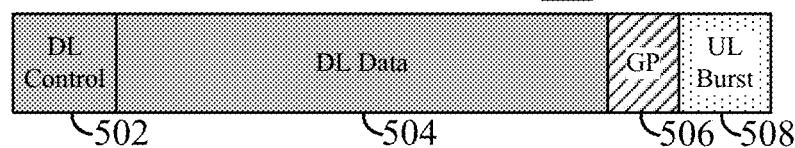
FIG. 5 is a diagram illustrating an example of a DL-centric time division duplex (TDD) subframe and an example of an UL-centric TDD subframe according to aspects of the present disclosure.
Figure 5:
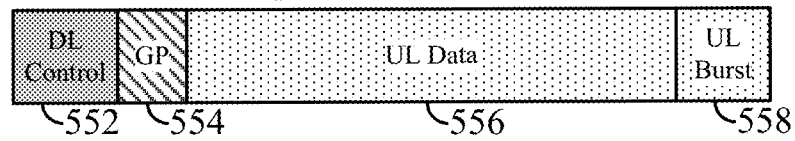

According to an aspect of the disclosure, one or more slots may be structured as self-contained slots. For example, FIG. 5 illustrates an example downlink centric slot 500 and an example uplink centric slot 550. The centric slots 500 and/or 550 may be used, in some examples, in place of the slot described above and illustrated in FIG. 4.

In the illustrated example, the downlink centric slot 500 may be a transmitter-scheduled slot. The nomenclature "downlink centric" generally refers to a structure wherein more resources are allocated for transmissions in the DL direction (e.g., transmissions from a base station 110 to a UE 120). Similarly, the uplink centric slot 550 may be a receiver-scheduled slot, wherein more resources are allocated for transmissions in the UL direction (e.g., transmissions from the UE 120 to the base station 110).

Each slot, such as the self-contained slots 500 and 550, may include uplink and downlink portions. For example, in the downlink centric slot 500, the base station 110 first has an opportunity to transmit control information, e.g., on a PDCCH, in a downlink control region 502, and then an opportunity to transmit downlink user data or traffic, e.g., on a PDSCH/PDCCH in a downlink data region 504. Following a guard period (GP) region 506 having a suitable duration 510, the base station 110 has an opportunity to receive uplink data and/or uplink feedback including any uplink scheduling requests, channel state feedback (CSF), a hybrid automatic repeat request (HARD) acknowledgment/negative acknowledgment (ACK/NACK), etc., in an uplink burst 508 from other entities using the carrier. Here, a slot such as the downlink centric slot 500 may be referred to as a self-contained slot when all of the data carried in the data region 504 is scheduled in the control region 502 of the same slot; and further, when all of the data carried in the data region 504 is acknowledged (or at least has an opportunity to be acknowledged) in the uplink burst 508 of the same slot. In this way, each self-contained slot may be considered a self-contained entity, not necessarily requiring any other slot to complete a scheduling-transmission-acknowledgment cycle for any given packet.

The GP region 506 may be included to accommodate variability in uplink and downlink timing. For example, latencies due to radio frequency (RF) antenna direction switching (e.g., from downlink to uplink) and transmission path latencies may cause the UE 120 to transmit early on the uplink to match downlink timing. Such early transmission may interfere with symbols received from the base station 110. Accordingly, the GP region 506 may allow an amount of time after the downlink data region 504 to prevent interference, where the GP region 506 provides an appropriate amount of time for the base station 110 to switch its RF antenna direction, an appropriate amount of time for the over-the-air (OTA) transmission, and an appropriate amount of time for ACK processing by the UE 120.

Similarly, the uplink centric slot 550 may be configured as a self-contained slot. The uplink centric slot 550 is substantially similar to the downlink centric slot 500, including a downlink control region 552, a GP 554, an UL data region 556, and optionally, an UL burst region 558.

The slot structure illustrated in slots 500 and 550 is merely one example of self-contained slots. Other examples may include a common downlink portion at the beginning of every slot, and a common uplink portion at the end of every slot, with various differences in the structure of the slot between these respective portions. Other examples still may be provided within the scope of the present disclosure.

In certain aspects, a UE (e.g., UE 120) is configured with multiple antennas and able to communicate (e.g., transmit and/or receive) over multiple spatially diverse paths by employing spatial diversity methods. For example, a UE 120 may receive the same signal (e.g., downlink transmission) transmitted from a TRP of one or more base stations (e.g., base station 110) over multiple antennas, thereby receiving the same signal over multiple spatially diverse paths corresponding to the different physical positions of the multiple antennas. In another example, a UE 120 may receive different signals (e.g., carrying the same or different data) transmitted from the one or more TRPs over different antennas using spatial diversity of the multiple antennas at the UE 120.

In certain aspects, spatial diversity techniques are used to provide ultra-reliable low latency communication (or URLLC) (e.g., a latency of one millisecond and the system reliability of 99.999%. That is, there is a failure if more than one out of $10^5$ packets fails to be delivered in one millisecond). For example, a UE 120 may be connected to and receive signals from a plurality of TRPs from one or more base stations 110 using a spatial diversity technique known as coordinated multipoint (CoMP), such as joint transmission (JT), non-coherent JT, etc. By employing multiple TRPs to send data to a UE 120, latency of sending data may be reduced due to data being sent from multiple sources. Further, if a UE 120 is connected to a plurality of TRPs, the effective signal-to-interference ratio (SINR) for a joint downlink transmission from the multiple TRPs will be higher. Further, if a UE is connected to a plurality of TRPs, and the UE 120 is unable to receive and/or decode data from one TRP (e.g., because of a downlink decoding failure), the UE 120 may still be connected to and able to receive and decode data from one of the other plurality of TRPs. For example, in factory automation a UE 120 (e.g., computers, robots, equipment, tooling, etc.) can be connected to multiple TRPs using spatial diversity to achieve a URLLC system. Though certain aspects are described herein with respect to CoMP, it should be noted that the described aspects may apply to other spatial diversity techniques as well, such as carrier aggregation (CA) and dual connectivity (DC) with packet duplication.

Example Communication System with Autonomous Reference Signal Adaption

In certain aspects, in order to facilitate the UE 120 receiving and decoding downlink transmissions from multiple TRPs of one or more base stations 110 using spatial diversity, each base station 110 may use certain downlink information (e.g., channel information) about a downlink between the TRP and the UE 120 to appropriately adapt (e.g., using precoding) downlink transmissions from the TRP to the UE 120 on the downlink.

In certain aspects, a base station 110 determines certain downlink information by measuring one or more reference signals (e.g., a sounding reference signal (SRS) or receiving information indicative of the downlink (e.g., CSI reporting) transmitted from the UE 120 to the TRP. Typically, a reference signal is sent by a UE 120 to a TRP in an uplink communication. The uplink may be similar to the downlink (e.g., same frequency, similar frequency, etc.) and accordingly, measurements of signals transmitted on the uplink may be indicative of conditions on the downlink. For example, a UE 120 may transmit a reference signal to a TRP using wireless communication resources (e.g., resource elements, resource blocks (RBs), slots, etc.) that are close to, or within subcarriers assigned to the UE 120 for downlink communication with the TRP. Accordingly, a base station 110 may measure the received reference signal on the uplink to determine the downlink information.

In certain aspects, the communication resources are candidate uplink resources provided to the UE 120 by the base station 110. For example, the communication resources include one or more symbols occurring before a future (e.g., scheduled, upcoming, caused by a retransmission and etc.) downlink PDSCH transmission. Here, the communication resources are determined by the UE 120 based on configuration information sent by the base station to the UE. In certain aspects, the configuration information comprises one or more of an information about symbols in a slot associated with the communication resources on the uplink. For example, this could be an index of the symbols within a slot. In certain aspects, the configuration information comprises one or more of an information about slots associated with the communication resources on the uplink. For example, this could include one or more of an index of slots (e.g., within a frame) and/or periodicity and offset relative to a slot associated with the future downlink transmission. In certain aspects, the configuration information comprises one or more of an information about subcarriers associated with the communication resources on the uplink. For example, this could include one or more of an index of subcarrier (e.g., within an RB), and/or periodicity and offset relative to a subcarrier (e.g., a starting and/or ending subcarrier) associated with the future downlink transmission.

As discussed, in order for a base station 110 to more accurately estimate conditions on a downlink based on measuring a reference signal transmitted by a UE 120 on an uplink, the UE 120 may transmit the reference signal on resources in subcarriers assigned to the UE 120 for downlink communication with the TRP. For example, a base station 110 is configured to assign certain subcarriers to the UE 120 for communication on the downlink. In certain aspects, the base station 110 may assign the subcarriers to the UE 120 using RRC signaling by sending an RRC message or downlink grant to the UE 120 indicating the subcarriers. In certain aspects, the base station 110 configures the UE 120 with a downlink scheduling configuration (e.g., configured scheduling (CS) or semi-persistent scheduling (SPS) configuration). The downlink scheduling configuration provides information regarding which subcarriers the UE 120 is assigned on the downlink at different times. It will be appreciated that detecting a future downlink transmission from the base station 110 may include receiving a grant for a plurality of future downlink transmissions (e.g., CS or SPS grant).

The base station 110 is further configured to assign resources to the UE 120 for the UE 120 to use to transmit one or more reference signals on the uplink. For example, the base station 110 is configured to assign certain resources on the uplink to the UE 120 by transmitting an RRC message to the UE 120 indicating the resources assigned for transmission of one or more reference signals on the uplink. The base station 110 may assign the resources to the UE 120 for transmitting the one or more reference signals on the uplink in subcarriers assigned to the UE 120 for downlink transmission.

In certain aspects, the downlink resources granted to a UE 120 for receiving downlink transmissions transmitted from a TRP may change or be different from those indicated in an initial downlink scheduling configuration. For example, the UE 120 may receive a new downlink scheduling configuration from a TRP (e.g., in a future downlink PDSCH transmission). For example, an inter-TRPmobility event may occur where a UE 120 moves from a connection with one TRP to a connection with another TRP, channel conditions on a downlink or uplink may change (e.g., RF conditions may change) (e.g., due to a change in location of a UE 120 and/or TRP, electromagnetic interference, a new obstacle, etc.), and accordingly, the base station 110 may send a new downlink scheduling configuration to the UE 120 in a future downlink transmission (e.g., using RRC signaling).

In another example, a UE 120 may not successfully receive and decode a downlink transmission from a TRP on the downlink on a first set of downlink resources. Accordingly, the base station 110 may be configured to send a retransmission on the downlink to the UE 120 (e.g., using a HARQ procedure) on a second set of downlink resources. The second set of downlink resources may be different than the first set of downlink resources. In certain aspects, downlink resources associated with the future downlink transmission from the base station comprise downlink resources for a retransmission from the base station to the UE 120 indicated by a message from the base station to the UE 120 in the downlink resource. It will be appreciated that this could be an RRC message, which may indicate a set of RBs that may be used for the retransmission by the base station 110 to the UE 120.

Accordingly, in order for the base station 110 to determine downlink information for the different downlink resources, the UE 120 may transmit one or more reference signals on resources/subcarriers on the uplink that are similar to or the same as the different downlink resources. Conventionally, as discussed, the base station 110 configures the UE 120 with resources for the UE 120 to utilize to transmit reference signals on the uplink using RRC signaling. However, RRC signaling can be time consuming and provide latency between the change in grant of downlink resources to the UE 120 and configuring the UE 120 with updated uplink resources to transmit reference signals. Such latency may not fulfill the requirements of URLLC systems.

Accordingly, certain aspects herein provide systems and methods for autonomous reference signal transmission configuration. For example, certain aspects allow a base station 110 and UE 120 to autonomously and automatically determine resources (e.g., referred to as reference signal (RS) resources) to utilize to communicate one or more reference signals on an uplink based on a future downlink PDSCH transmission (e.g., a change in downlink resources) thereby bypassing the need for an RRC message for reconfiguration. As such, latencies associated with the time required to send an RRC message for configuration of reference signals, and the time to process such a message can be eliminated. The RS resources may correspond to periodic, semi-persistent, aperiodic, and the like.

Figure 6:
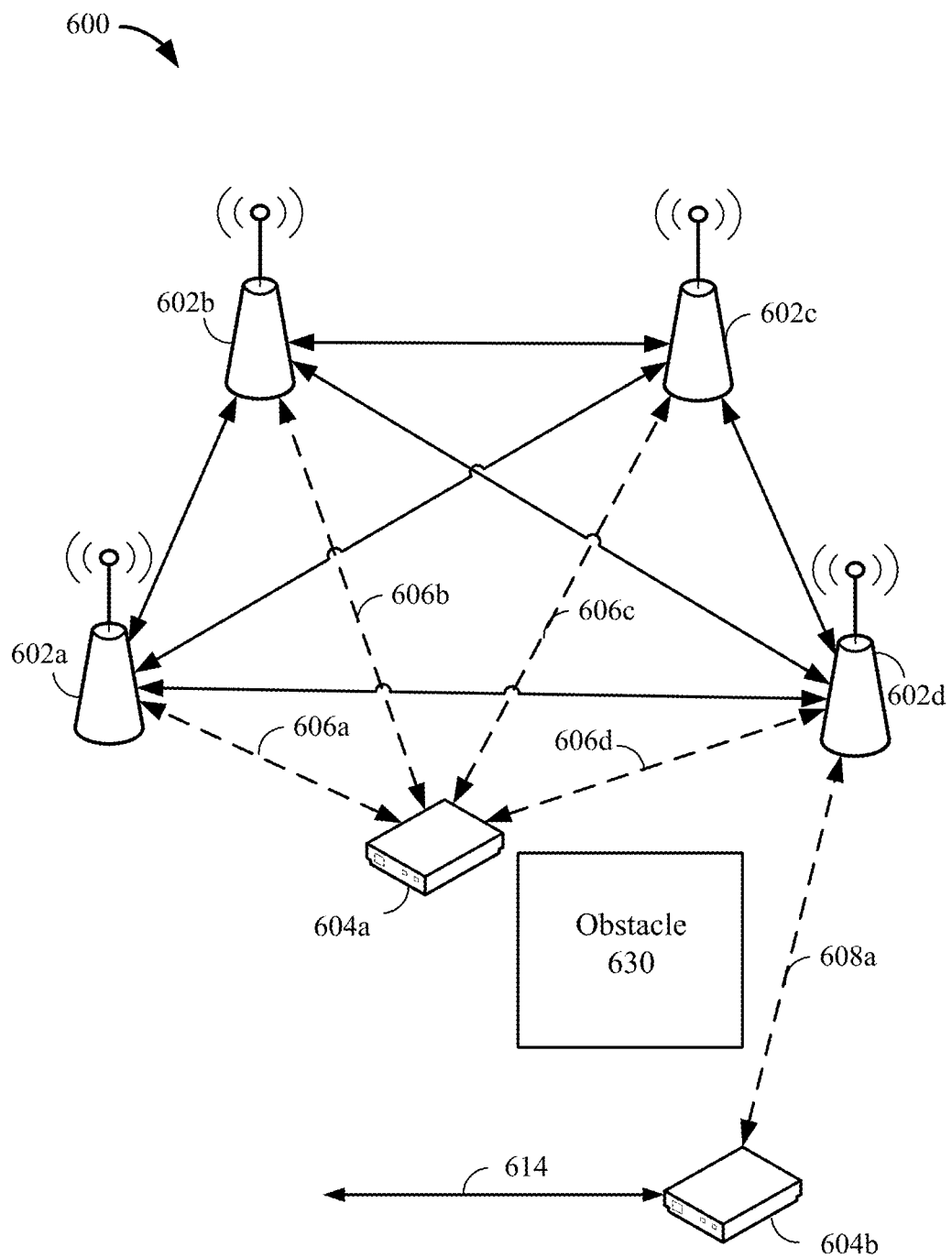
FIG. 6 is a diagram showing an example environment in accordance with certain aspects of the present disclosure.

FIG. 6 depicts a wireless network 600, which provides URLLC in accordance with certain aspects of the disclosure. Wireless network 600 includes base stations 602(a-d) having with one or more TRPs configured to use CoMP. In certain aspects, wireless network 600 is representative of a service area or cell (e.g., macro cell, pico cell, femto cell, etc. described above and illustrated in FIG. 1), and may be connected to another wireless network (not shown).

Wireless network 600 includes UEs 604a (e.g., a stationary UE) and UE 604b (e.g., a mobile UE that can travel along path 614). UE 604a is in communication with base stations 602(a-d) through connections 606a-d. UE 604b is in communication with base station 602d through connection 608a, and at times may be connected to base stations 602(b-d) (connections not shown). It will be appreciated that UE 604b may be located behind obstacle 630 (e.g., equipment, an electromagnetic interference, a person, etc.). In certain aspects, UE 604b may be able to connect and receive data from base stations 602(a-d). In certain aspects, UE 604b may not be able to connect to one or more of base stations 602(a-d) and there may need to be a future downlink transmission based in part on a change in configuration or a transmission error between UE 604b and one or more of base stations 602(a-d). In some examples, the UE 604a and/or 604b may be the same as the UE 120 described above and illustrated in FIGS. 1 and 2.

It is to be understood that the wireless network 600 may include any number of wireless base stations and UEs. Further, a relay node may be deployed to extend the size or coverage area of the wireless network 600. The base stations 602a-d provide wireless access points to a core network for any number of mobile apparatuses. In some examples, the base stations 602a-d may be the same as the base station 110 described above and illustrated in FIGS. 1 and 2.

Figure 7:
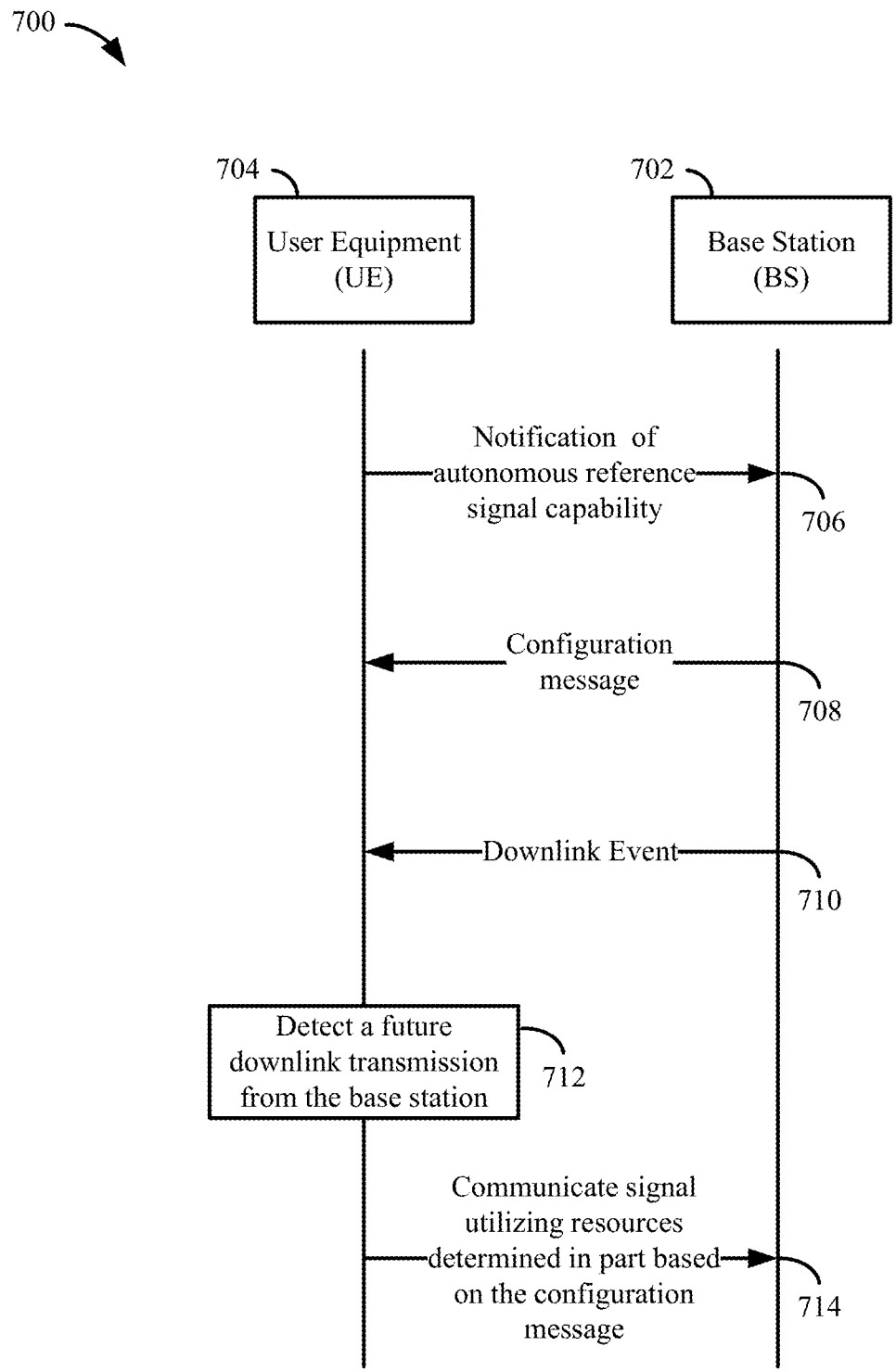
FIG. 7 is an example call flow illustrating communication between a base station (BS) and UE, in accordance with some aspects of the present disclosure.

FIG. 7 is an example call flow illustrating communication between a base station (BS) and UE, in accordance with some aspects of the present disclosure. It is to be understood that the process flow 700 may include any number of wireless base stations and UEs. In some examples, the wireless networks of FIGS. 1 and 6 may implement aspects of the process flow 700.

In certain aspects, a UE 704 communicates a first signal 706 to the network (e.g., a base station 702) indicating that the UE 704 has a capability to support an autonomous reference signal transmission feature. In certain aspects, the UE 704 communicates the first signal 706 (e.g., RRC message)) to the base station 702 in an uplink communication. As noted above, the autonomous reference signal transmission feature relates to a configuration that provides the UE 704 with an ability to transmit one or more reference signals (e.g., SRS, CSI, etc.) to the base station 702 using an uplink-centric slot in one or more candidate resources (e.g., resource blocks (RBs)) after a downlink event (e.g., interruption in communication, decoding error, etc.), without explicit signaling or instruction from the base station 702.

In certain aspects, the base station 702 may be preconfigured for autonomous reference signal transmission configuration, and can provide the UE 704 with configuration information. The base station 702 may configure the UE 704 with an indication of communication resources that the base station 702 will use for retransmission on the downlink based on the UE 704 indicating it is capable of autonomous reference signal transmission. That is, in response to the first signal 706, the UE 704 may receive a configuration message 708 from the base station 702 providing information for configuring the UE 704 with the autonomous reference signal transmission feature. For example, the configuration message 708 may be communicated by one or more of an RRC message, a MAC CE, or a packet data convergence protocol (PDCP) control packet data unit (PDU). Once the configuration message 708 is received, the UE 704 may update its memory (e.g., update a reference signal codebook) and/or processing system to utilize the autonomous reference signal transmission feature.

In some examples, the configuration information includes an indication of the one or more candidate resources that the UE 704 can utilize to transmit one or more reference signals to the base station 702. In some examples, the candidate resources include one or more RBs configured for communicating downlink grants. In some examples, the configuration information includes a rule that the UE 704 can use to determine the one or more candidate resources. In one example, the configuration information includes an indication of one or more symbols in a resource block (RB) of a downlink channel. In this example, the one or more symbols in the RB may include resources utilized by the base station 702 in a failed transmission or other downlink event. In some examples, the configuration information is based at least in part on the capability indication communicated by the UE 704 via the first signal 706.

A downlink event 710 may occur during communication between the UE 704 and the base station 702. The downlink event 710 may include: a change in downlink scheduling configuration, a downlink decoding failure, an interruption in transmission, etc. That is, a downlink event may include a base station 702 downlink transmission that the UE 704 does not successfully receive or decode, or a downlink event that requires a retransmission of the original communication. Accordingly, the base station 702 may be required to perform a retransmission.

In certain aspects, the UE 704 may detect a future downlink transmission 712 from the base station 702 based on one or more downlink events 710. In one example, detecting the future downlink transmission 712 may include a determination by the UE 704 that the base station 702 will perform a retransmission based at least in part on the downlink event 710. In another example, detecting the future downlink transmission 712 may include a determination by the UE 704 to communicate a negative-acknowledgement (NAK) to the base station 702 in response to the downlink event 710.

In response to detecting the future downlink transmission 712 from the base station 702, the UE 704 may determine to communicate a second signal 714 utilizing uplink resources provided by the configuration message 708. In one example, the UE 704 determines which communication resources of the base station 702 provided candidate resources to select. In another example, the UE 704 may select an uplink resource (e.g., UL burst 508) in a future downlink transmission, or an uplink resource in a future uplink transmission. In some examples, the UE 704 may determine the future uplink resources based on scheduling information provided by the configuration message 708. In some examples, the UE 704 may select communication resources in one or more uplink centric slots of the candidate resources before a downlink centric slot including downlink grants. Accordingly, it will be appreciated that in certain aspects, a change in a downlink grant may cause a change in the candidate resources that the UE 704 utilizes to transmit one or more reference signals to the base station 702.

In certain aspects, the UE 704 may generate and transmit a reference signal (e.g., second signal 714) after detecting the future downlink transmission. The UE 704 detecting a future downlink transmission may be based in part on a downlink decoding error, or otherwise not being able to decode a first transmission from a TRP of the base station 702. In this case, UE 704 may determine to send a NAK to the base station 702 indicating the transmission error so the base station 702 can send a retransmission of the first transmission. As discussed, the base station 702 may use different communication resources for the first transmission on a downlink as compared to for a retransmission. Accordingly, in certain aspects, the UE 704 is configured to send a reference signal on an uplink in communication resources to be used for retransmission by the base station 702 on the downlink, such as in one or more uplink centric slots prior to the retransmission and after the transmission error. In certain aspects, the UE 704 is configured to send the reference signal along with the NAK as part of a same transmission. In certain aspects, the communication resources used for retransmission on the downlink are provided to the UE 704 by the network (e.g., by the base station 702 sending the configuration message 708 (e.g., an RRC message) to the UE 704 indicating the communication resources).

In some configurations, the base station 702 uses the one or more reference signals received from the UE 704 to determine downlink resources for a downlink communication (e.g., retransmission) to the UE 704. In certain aspects the base station 702 determines certain downlink information by measuring the one or more reference signals communicated by the UE 704. Accordingly, alternative or in addition to transmitting a reference signal, the UE 704 may send information about a downlink to a TRP for the associated base station 702 to adapt transmissions (e.g., a retransmission) to the UE 704 on the downlink.

For example, the UE 704 may be configured to send CSI (e.g., asynchronous CSI) to the base station 702 based on measurement of a CSI-RS resource after detecting a future downlink transmission comprising determining that the base station will perform a retransmission based in part on detecting a downlink decoding failure and a determining by the UE 704 to send a negative-acknowledgement (NAK) to the base station 702 so the base station 702 can send a retransmission. As discussed, the base station 702 may use different communication resources for first transmission on a downlink as compared to for a retransmission. Accordingly, in certain aspects, the UE 704 is configured to send CSI on an uplink to the base station 702, such as in one or more uplink centric slots prior to the retransmission and after detecting a future downlink transmission (e.g., based in part on a transmission error (e.g., a downlink decoding failure)).

In certain aspects, the UE 704 is configured to send the CSI along with the NAK as part of a same transmission. The CSI may be generated by the UE 704 based on one or more of a signal-to-interference ratio (SINR) and/or a log-likelihood ratio (LLR) of a first transmission the UE is unable to decode, and/or an estimated SINR for a retransmission of the first transmission. In certain aspects, an estimated SINR for retransmission may be determined based on one or more of: a downlink transmission adaptation using an aperiodic SRS (e.g., due to more accurate precoding), the type of CoMP configuration used for retransmission (e.g. different from the first transmission, or no CoMP for the first transmission), SINR for one or more previous transmissions (e.g., the first transmission), and/or measurements of CSI-RS downlink resources communicated from the base station 702 to the UE 704 (e.g., a periodic CSI-RS resource) configured for determining CSI of retransmission based at least in part on a CoMP scheme for retransmission. It will be appreciated that base station 702 can use the reference signals described above to adapt precoding (e.g., for a retransmission).

Figure 8:
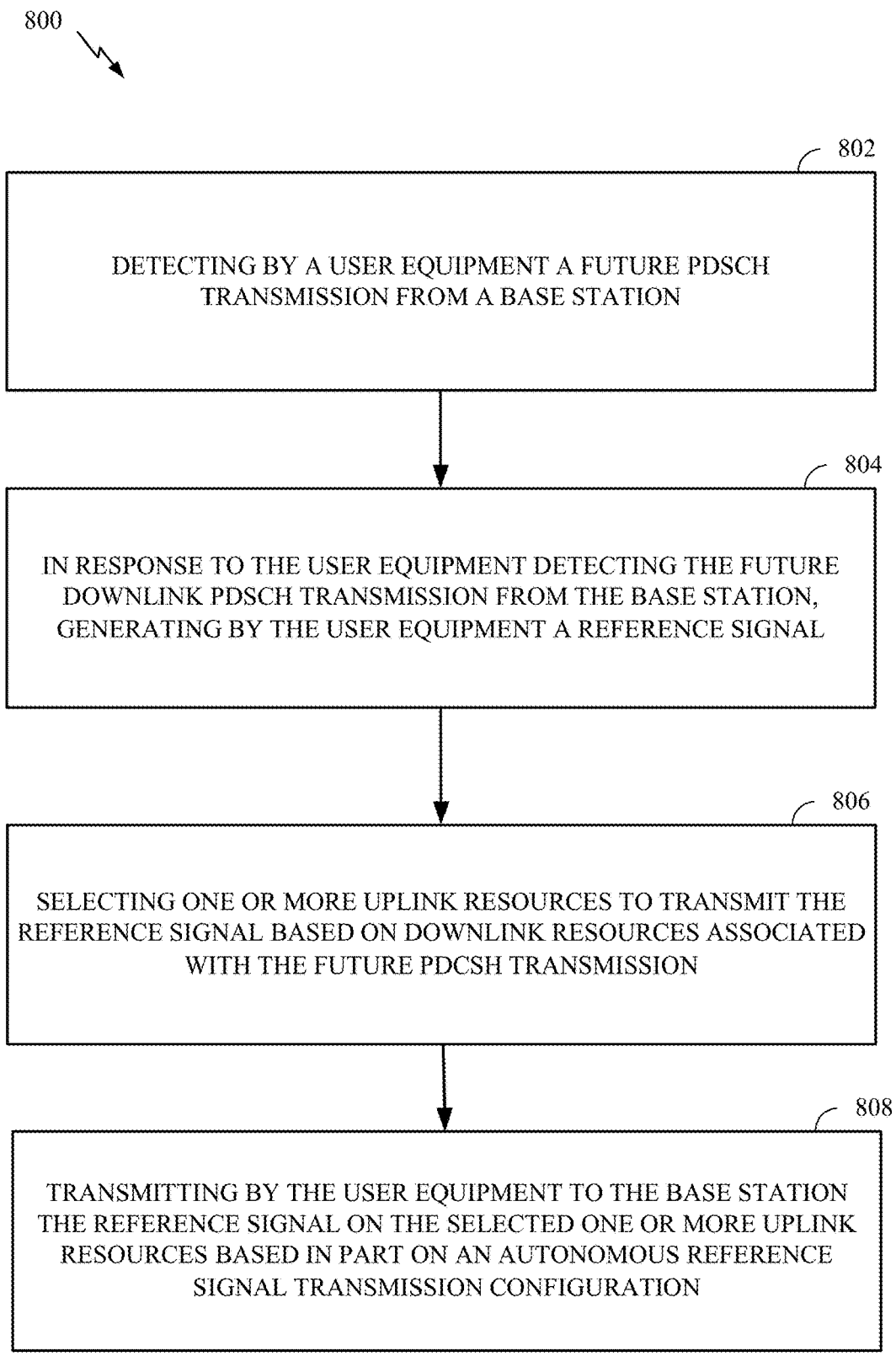
FIG. 8 illustrates a flow chart in accordance with certain aspects of the present disclosure.

FIG. 8 shows a method 800 of transmitting a reference signal from a UE to a base station in accordance with certain aspects of the disclosure. At step 802, a UE (e.g., UEs 604(*a-b*) in FIG. 6 or UE 704 in FIG. 7) detects a future downlink transmission from a base station (e.g., base stations 602(*a-d*) in FIG. 6 or base station 702 in FIG. 7.). In certain aspects, detecting a future downlink transmission comprises determining that the base station will perform a retransmission based in part on detecting a downlink decoding failure of a transmission and a determining by the UE to send a negative-acknowledgement (NAK) to the base station.

At step 804, in response to the UE detecting the future downlink transmission from the base station, the UE generates a reference signal. At step 806, the UE selects one or more communication resources on the uplink to transmit the reference signal based on downlink resources associated with the future downlink transmission.

At step 808, the UE transmits the reference signal on the selected one or more communication resources.

Example Communication System with Joint DCI Configuration

It will be appreciated that downlink transmissions from multiple antennas or transmission reception points (TRPs) of a base station (e.g., BS 110) and uplink resource allocation for one or more UEs (e.g., UE 120) can change in bursts (or groups). For example, when considering a network using a CoMP spatial diversity technique and a central scheduler, a change in uplink and/or downlink allocation for one UE 120 may cause a change in uplink and/or downlink allocation for one or more other UEs 120 at the central scheduler. The base stations (e.g., BS 110) and UEs 120 use various techniques to manage these bursts of resource allocation changes.

To meet URLLC reliability and latency requirements, the BS 110 and UEs 120 should be able to quickly adapt to changing channel conditions. To facilitate resource allocation changes between a base station 110 and a plurality of UEs 120, the base station 110 may transmit downlink transmissions from one or more antennas to the UE 120 on the control information (DCI) to each UE 120. However, sending separate DCI for each information type (e.g., uplink data, downlink data, sounding reference signal (SRS), and channel state information reference signal (CSI-RS)) is inefficient and reduces adaptation speed, which increases latency. Accordingly, the joint DCI configuration techniques disclosed herein improve latency, for example, by indicating multiple information types using a single DCI.

It will be appreciated that a downlink allocation change for a UE 120 may be associated with an updated SRS configuration so that the SRS is transmitted over one or more subcarriers associated with the downlink allocation in one or more slots prior to the associated transmission. It will be further appreciated that a CSI-RS configuration may also be associated with a downlink allocation (e.g., CSI-RS may be used to measure CSI for RBs associated with a downlink transmission in slots prior to the associated transmission).

In certain aspects described herein, a base station 110 may include and transmit to a UE 120 in DCI an indication of allocation of resources for communicating information types. For example, in certain aspects, DCI may include one or more parameters associated with an uplink data information type. Uplink data information type relates to transmission by one or more UEs and reception by one or more base stations 110. In certain aspects, parameters associated with uplink data include parameters indicative of a physical uplink shared channel (PUSCH) RB allocation. In certain aspects of the disclosure, a parameter that is indicative of an allocation of a resource is information that indicates the allocation of the resource itself. In other aspects, a parameter that is indicative of an allocation of resource is other information used to determine the allocation of the resource. In certain aspects, the PUSCH resource block allocation could comprise of allocation of resource blocks for PUSCH in one or more slots. A resource block allocation for more than one slot can be indicated using parameters associated with a Semi-Persistent Scheduling (SPS) grant or a Configured Scheduling (CS) grant.

In certain aspects, DCI may include one or more parameters associated with a downlink data information type. For example, in certain aspects, DCI may include one or more parameters associated with a downlink data information type. Downlink data information type relates to transmission by one or more base stations 110 and reception by one or more UEs 120. In certain aspects, parameters associated with downlink data include parameters indicative of a physical downlink shared channel (PDSCH) resource block (RB) allocation. In certain aspects, the PDSCH resource block allocation could comprise of allocation of resource blocks for PDSCH in one or more slots. A resource block allocation for more than one slot can be indicated using parameters associated with a Semi-Persistent Scheduling (SPS) grant or a Configured Scheduling (CS) grant.

In certain aspects, DCI may include a parameter associated with a sounding reference signal (SRS) information type. SRS information type relates to transmission of an SRS by one or more UEs 120 and reception by one or more base stations 110. In certain aspects, parameters associated with SRS information type include parameters indicative of a resource allocation for an SRS. In certain aspects, SRS allocation parameters include one or more of: a time (e.g., a delay from a beginning or end of a time slot including a DCI) for a first reference signal transmission (e.g., SRS transmission) (e.g., that may be measured in a number of slots, a number of symbols, a number of subframes, and a number of frames), a number of subsequent reference signal transmissions, a periodicity of subsequent reference signal transmissions, an offset of subsequent reference signal transmissions, a resource element density, an index of symbols within a slot with a transmission, a hopping configuration, and a cyclic shift configuration. It will be appreciated that in certain aspects, parameters indicative of a resource allocation for an SRS may only indicate a subset of resource elements (REs) of the resource blocks (RBs) (e.g., using RE density configuration, transmission symbol configuration, etc.).

In certain aspects, DCI may include a parameter associated with a channel state information reference signal (CSI-RS) information type. CSI-RS information type relates to transmission of a CSI-RS by one or more base stations 110 and reception by one or more UEs 120. In certain aspects, parameters associated with CSI-RS information type include parameters indicative of a resource allocation for a CSI-RS. In certain aspects, CSI-RS allocation parameters include one or more of: a time (e.g., a delay from a beginning or end of a time slot including a DCI) for a first reference signal transmission (e.g., CSI-RS transmission) (e.g., that may be measured in a number of slots, a number of symbols, a number of subframes, and a number of frames), a number of subsequent reference signal transmissions, a periodicity of subsequent reference signal transmissions, an offset of subsequent reference signal transmissions, a resource element density, an index of symbols within a slot with a transmission, a hopping configuration, and a cyclic shift configuration. It will be appreciated that in certain aspects, parameters indicative of a resource allocation for a CSI-RS may only indicate a subset of resource elements (REs) of the resource blocks (RBs) (e.g., using RE density configuration, transmission symbol configuration, etc.)

In certain aspects, DCI may include information indicative of a modulation and coding scheme (MCS) assignment for one or more of PDSCH RB allocation and PUSCH RB allocation.

In certain aspects, a base station 110 can be configured for joint DCI configuration by receiving a capability indication from a UE 120. The capability indication may indicate a capability of a UE 120 to support joint DCI configuration. The capability indication may be sent from the UE 120 (e.g., in one or more of a radio resource control (RRC) message, a Medium Access Control (MAC) Control Element (CE) message, and/or a Non-Access Stratum (NAS) message). When a UE 120 and base station 110 are capable of joint DCI configuration, the base station 110 can determine to indicate allocation of resources for communicating two or more information types to one or more UEs in a single DCI. It will be appreciated that joint DCI configuration at least allows for a reduction in DCI transmissions (e.g., compared to a base station 110 using a DCI for every indication of allocation of resources for communicating each information type).

In certain aspects, a DCI includes an allocation of resources for communicating two or more information types to one or more UEs 120 in a single DCI transmitted by a base station 110. In certain aspects, the DCI may include information that explicitly indicates allocated resources for communicating all or at least one of the information types.

In certain aspects, the DCI does not explicitly indicate allocated resources for communicating at least one of the information types. In some such aspects, the allocation of resources for communicating two or more information types to one or more user equipment is further indicated to the one or more UEs 120 using association information. It will be appreciated that the association information is transmitted to the one or more UEs 120 in one or more of: a radio resource control (RRC) message, a MAC (Medium Access Control) Control Element (CE) message, a Non-Access Stratum (NAS) message an association information message, or DCI. In certain aspects, association information includes an indication that resources for one information type of the two or more information types are allocated relative to resources for another information type of the two or more information types (e.g., the indication indicates that one or more of a downlink data, an uplink data, a CSI-RS and a SRS are allocated to same resource blocks). Accordingly, information in the DCI along with the association information can be used to indicate allocated resources for communicating the at least one of the information types. For example, one of the DCI and association information may indicate explicitly allocation of resources for communicating downlink data, and the other of the DCI and association information may indicate that allocation of resources for communicating uplink data is the same as allocation of resources for communicating downlink data. Accordingly, based on the DCI and association information together, allocation of resources for communicating uplink data is indicated.

In certain aspects, the allocation of resources for communicating two or more information types to one or more UEs is further indicated by a radio resource control (RRC) message including information indicative of the allocation of resources for communicating at least one of SRS and CSI-RS. For example, information indicative of the allocation of resources for communicating at least one of SRS and CSI-RS includes one or more of a resource element density, an index of symbols within a slot with a transmission, a number of transmissions after a first transmission, an offset of transmissions after the first transmission, a hopping configuration, a cyclic shift configuration, and periodicity of transmissions after the first transmission.

One or more UEs 120 capable of joint DCI configuration may receive a downlink control information (DCI), determine that the DCI includes two or more parameters, the two or more parameters indicating allocation of resources for communicating two or more information types, such as the information types described above, and communicate the two or more information types with a base station 110 using the allocated resources.

It will be appreciated that determining that a DCI includes two or more parameters, the two or more parameters indicating allocation of resources for communicating two or more information types, is in certain aspects based in part on cyclic redundancy check (CRC) information being encoded using a radio network temporary identifier (RNTI) associated with the UE 120. For example, determining that the DCI includes two or more parameters, the two or more parameters indicating allocation of resources for communicating two or more information types, is in certain aspects based on other UE 120 identifiers included in the DCI by the base station 110 (e.g., an identifier sent previously to the UE using an RRC message, or RNTIs such as a cell RNTI (CRNTI), a semi-persistent scheduling RNTI (SPS-RNTI), a configured scheduling RNTI, or another RNTI associated with a group of UEs including the UE 120).

In certain aspects, the downlink resources granted to a UE 120 for receiving downlink transmissions transmitted from a base station 110 may change or be different from those indicated in an initial downlink scheduling configuration. For example, the UE may receive a new downlink scheduling configuration from a TRP (e.g., in a future downlink PDSCH transmission). For example, an inter-base station mobility event may occur where a UE 120 moves from a connection with one base station 110 to a connection with another base station 110, channel conditions on a downlink or uplink may change (e.g., RF conditions may change) (e.g., due to a change in location of a UE 120 and/or base station 110, electromagnetic interference, a new obstacle, etc.), and accordingly, the base station 110 may send a DCI using joint DCI configuration.

Referring back to FIG. 6, communication system 600 employs a central scheduler (not shown). It will be appreciated that UE 604b may change location causing a change in its channel conditions. It will be further appreciated that the change in the channel conditions at UE 604b may result in a change in channel conditions at UE 604a (e.g., based on central scheduler operation (e.g., a change in resource allocation)).

In certain aspects, UEs 604 are capable of joint DCI configuration in accordance with the present disclosure. In certain aspects, base stations 602 can be configured for joint DCI configuration by receiving a capability indication from one or more of UEs 604. The capability indication may indicate a capability of UEs 604 to support joint DCI configuration. The capability indication may be sent from UEs 604 (e.g., in one or more of a radio resource control (RRC) message, a Medium Access Control (MAC) Control Element (CE) message, and a Non-Access Stratum (NAS) message). When UE 604s and base stations 602 are capable of joint DCI configuration, a base station 602 (e.g., base station 602a) can determine to indicate allocation of resources for communicating two or more information types to one or more UEs (e.g., to UE 604*a* and/or both UEs 604) in a single DCI. In certain aspects, UE 604*a* receives the DCI from base station 602*a*, and determine that the DCI includes two or more parameters, the two or more parameters indicating allocation of resources for communicating two or more information types to UEs 604 including UE 604*a*. As explained above, each of the two or more parameters is associated with a different one of the two or more information types.

Figure 9:
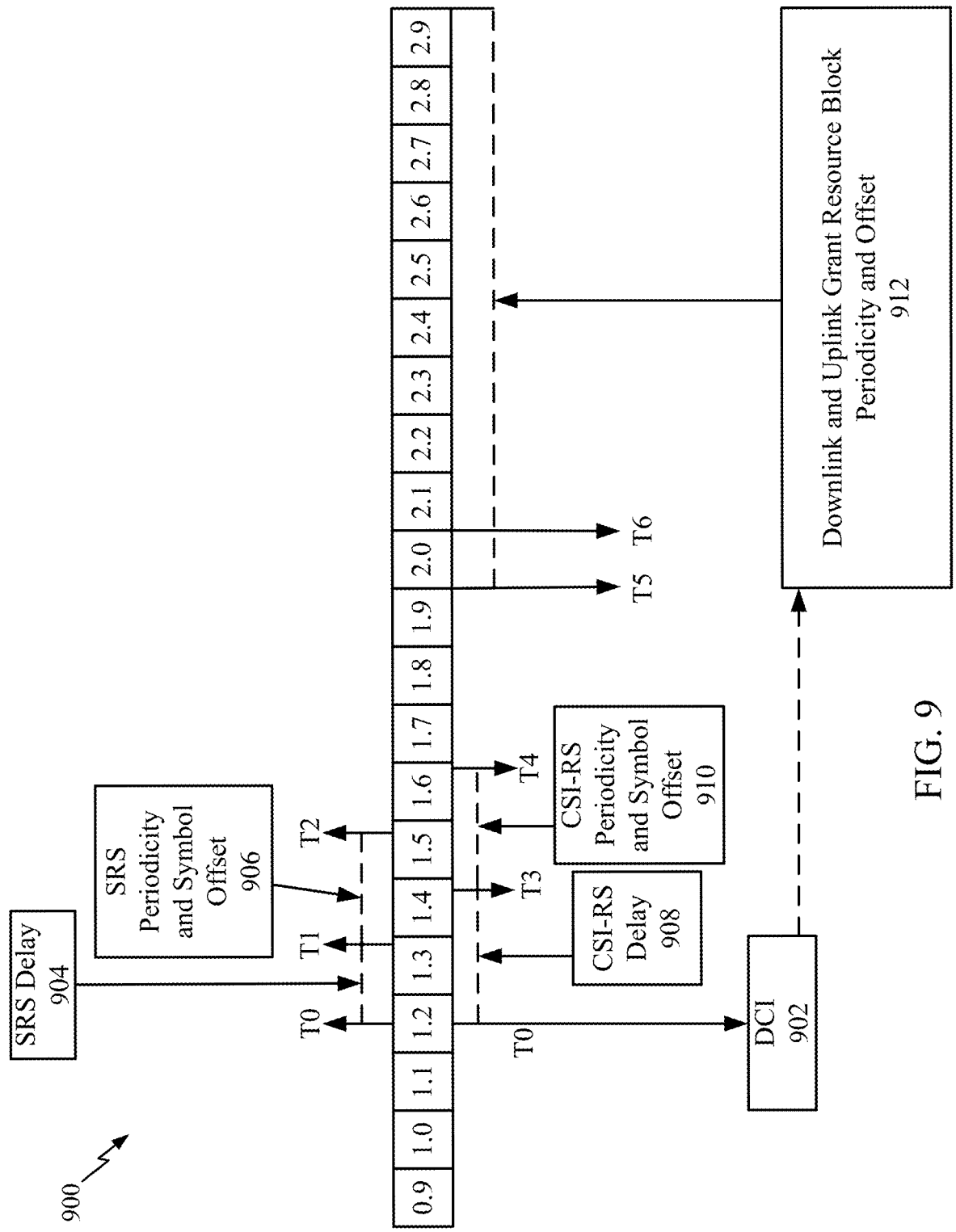
FIG. 9 illustrates a timeline for communicating in a wireless network in accordance with certain aspects of the disclosure.

FIG. 9 depicts a timeline 900 for communicating in a wireless network in accordance with certain aspects of the disclosure. As shown in FIG. 9, DCI 902 is a DCI generated using joint DCI configuration techniques discussed herein and transmitted at time T0 such as by one or more base stations (e.g., base stations 602(*a*-*d*) in FIG. 6 or base station 702 in FIG. 7) configured for utilizing joint DCI configuration (e.g., after receiving a capability indication from one or more UEs (e.g., UEs 604(*a*-*b*) in FIG. 6 of UE 704 in FIG. 7).

FIG. 9 shows DCI 902 sent by a base station 602 (not shown) including an indication of allocation of resources for communicating two or more information types to one or more UEs 604 (not shown) using at least in part two or more parameters each associated with a different one of the two or more information types.

FIG. 9 shows parameters associated with an uplink data information type and a downlink data information type. DCI 902 includes parameters 912, which are a downlink grant resource block (e.g., a physical downlink shared channel (PDSCH) resource block allocation) and an uplink grant resource block (e.g., a physical uplink shared channel (PUSCH) resource block allocation). As shown in FIG. 9, the parameters may include a delay for the first downlink or uplink grant, and a periodicity for subsequent downlink or uplink resource blocks. For example, T5 may be a time parameter that indicates the first downlink grant (e.g., based on a time delay from T0), and T6 may be a time parameter that indicates a first uplink grant (e.g., based on a time delay from T5 and/or T0). It will be appreciated that any of the parameters that indicate a time period may be used to calculate a delay along timeline 900 (e.g., T0-T6) and may be measured in a number of slots, a number of symbols, a number of subframes, and/or a number of frames.

FIG. 9 further shows parameters associated with an SRS information type (e.g., parameters 904 and 906). As shown in FIG. 9, parameters 904 and 906 may include one or more of: a time for a first reference signal (RS) transmission, a number of subsequent RS transmissions, a periodicity of the subsequent RS transmissions, an offset of subsequent RS transmissions, resource element density, index of symbols within a slot with a transmission, a hopping configuration, and a cyclic shift configuration. For example, T1 may be a time parameter that indicates the delay (e.g., based on a time delay from T0) for a first reference signal (e.g., SRS), and T2 may be a time parameter that indicates a reference signal periodicity and symbol offset (e.g., based on a T1 and/or T0).

FIG. 9 further shows parameters associated with an CSI-RS information type (e.g., parameters 908 and 910). As shown in FIG. 9, parameters 908 and 910 may include one or more of: a time for a first reference signal (RS) transmission, a number of subsequent RS transmissions, a periodicity of the subsequent RS transmissions, an offset of subsequent RS transmissions, resource element density, index of symbols within a slot with a transmission, a hopping configuration, and a cyclic shift configuration. For example, T3 may be a time parameter that indicates the delay (e.g., based on a time delay from T0) for a first reference signal (e.g., CSI-RS), and T4 may be a parameter that indicates a reference signal periodicity and symbol offset (e.g., based on a T3 and/or T0).

It will be further appreciated that DCI 902 may further include information indicative of a modulation and coding scheme (MCS) assignment for one or more of PDSCH RB allocation and PUSCH RB allocation. In certain aspects, DCI 902 includes association information (e.g., information indicating that resources for one information type are allocated relative to resources for another information type). In certain aspects, DCI 902 is based in part on one or more of resource element density, index of symbols within a slot with a transmission, number of transmissions after a first transmission, offset of transmissions after the first transmission, a hopping configuration, a cyclic shift configuration, and periodicity of transmissions after the first transmission.

Figure 10:
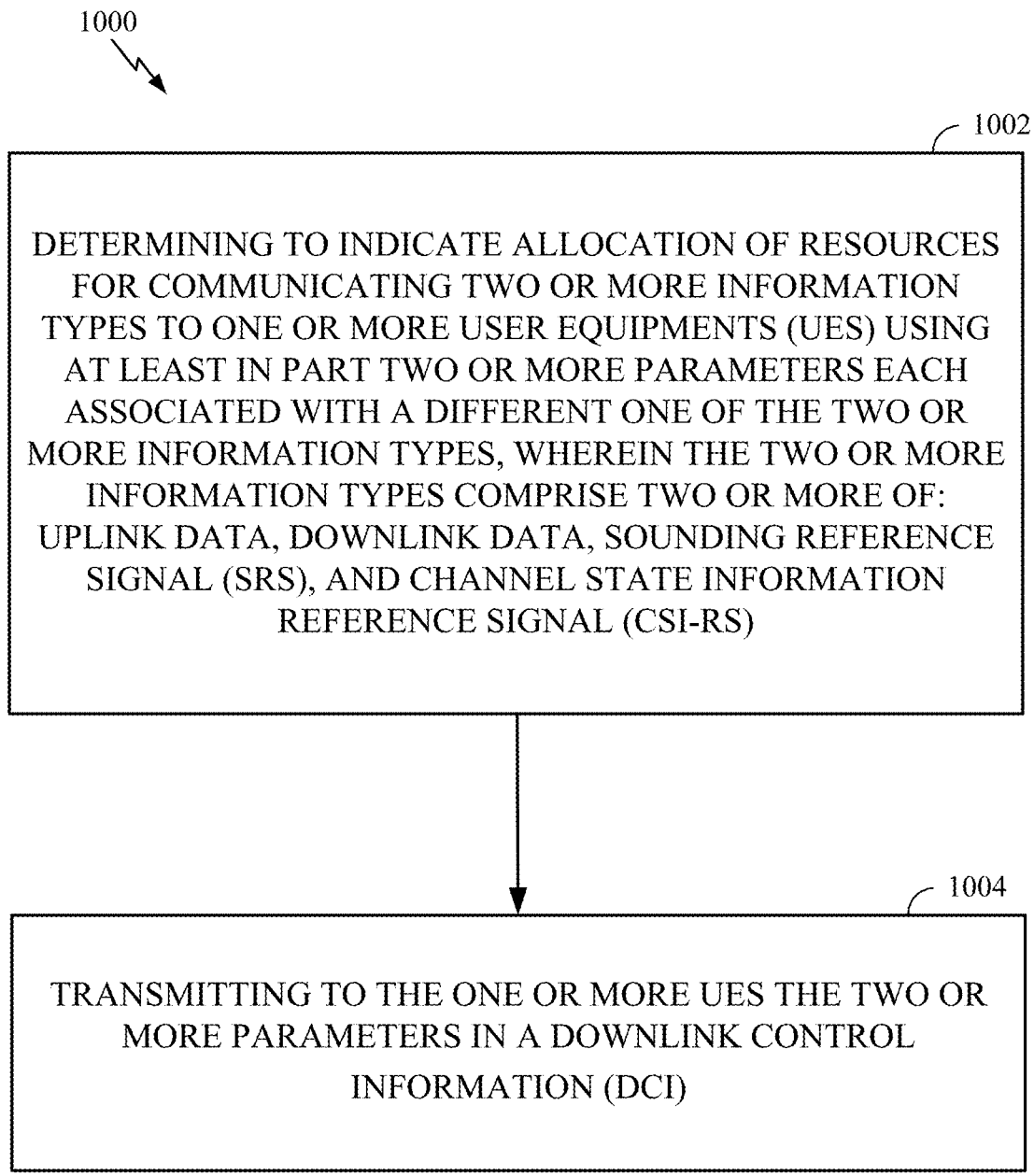
FIG. 10 illustrates a flow chart in accordance with certain aspects of the present disclosure.

FIG. 10 illustrates a flow chart illustrating operations 1000 for joint DCI configuration. At block 1002, a base station (e.g., base stations 602(*a*-*d*) in FIG. 6 or base station 702 in FIG. 7) determines to indicate allocation of resources for communicating two or more information types to one or more UEs (e.g., UEs 604(*a*-*b*) in FIG. 6 or UE 704 in FIG. 7) using at least in part two or more parameters each associated with a different one of the two or more information types, wherein the two or more information types comprise two or more of: uplink data, downlink data, sounding reference signal (SRS), and channel state information reference signal (CSI-RS). At block 1004, the base station 602 transmits to the one or more UEs 604 the two or more parameters in a DCI (e.g., DCI 902 in FIG. 9).

Figure 11:
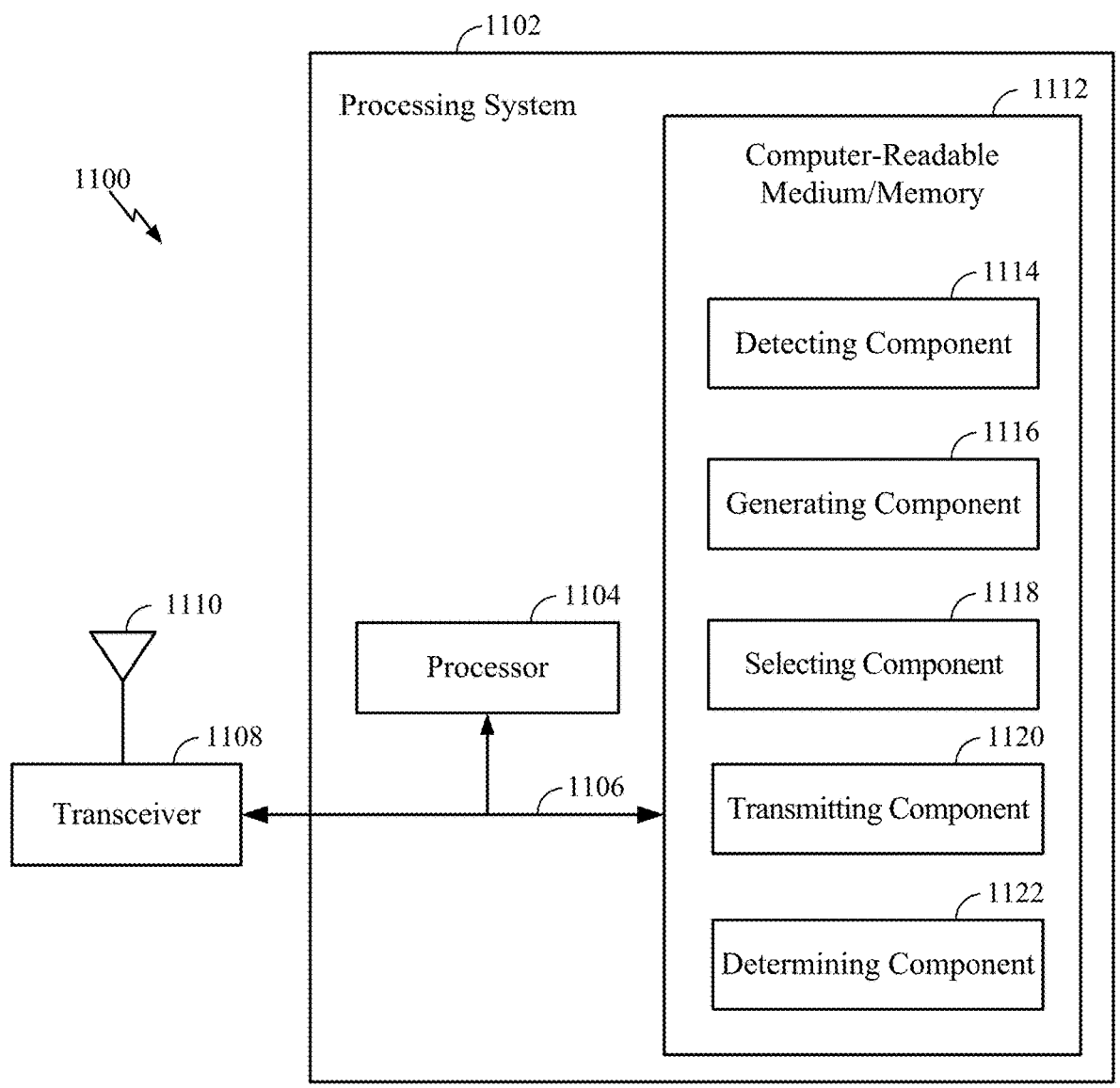
FIG. 11 illustrates a communications device that may include various components configured to perform operations for the techniques disclosed herein in accordance with aspects of the present disclosure.

FIG. 11 illustrates a communications device 1100 that may include various components (e.g., corresponding to means-plus-function components) configured to perform operations for the techniques disclosed herein, such as the operations illustrated in FIGS. 7, 8, and 10. The communications device 1100 includes a processing system 1102 coupled to a transceiver 1108. The transceiver 1108 is configured to transmit and receive signals for the communications device 1100 via an antenna 1110, such as the various signal described herein. The processing system 1102 may be configured to perform processing functions for the communications device 1100, including processing signals received and/or to be transmitted by the communications device 1100.

The processing system 1102 includes a processor 1104 coupled to a computer-readable medium/memory 1112 via a bus 1106. In certain aspects, the computer-readable medium/memory 1112 is configured to store instructions that when executed by processor 1104, cause the processor 1104 to perform the operations illustrated in FIGS. 7, 8, and 10, or other operations for performing the various techniques discussed herein.

In certain aspects, the processing system 1102 further includes a detecting component 1114 for performing the operations illustrated in FIG. 8 step 802. Additionally, the processing system 1102 includes a generating component 1116 for performing the operations illustrated in FIG. 8 step 804. Additionally, the processing system 1102 includes a selecting component 1118 for performing the operations illustrated in FIG. 8 step 806. Additionally, the processing system 1102 includes a transmitting component 1120 for performing the operations illustrated in FIG. 8 step 806. The detecting component 1114, the generating component 1116, the selecting component 1118, and the transmitting component 1120 may be coupled to the processor 1104 via bus 1106. In certain aspects, the detecting component 1114, the generating component 1116, the selecting component 1118, and the transmitting component 1120 may be hardware circuits. In certain aspects, the detecting component 1114, the generating component 1116, the selecting component 1118, and the transmitting component 1120 may be software components that are executed and run on processor 1104.

In certain aspects, the processing system 1102 further includes a determining component 1122 for performing the operations illustrated in FIG. 11 step 1002. Additionally, the processing system 1102 includes a transmitting component 1120 for performing the operations illustrated in FIG. 10 step 1004. The determining component 1122 and the transmitting component 1120 may be coupled to the processor 1104 via bus 1106. In certain aspects, the determining component 1122 and the transmitting component 1120 may be hardware circuits. In certain aspects, the determining component 1122 and the transmitting component 1120 may be software components that are executed and run on processor 1104.

Additional Considerations

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-Ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in FIGS. 7, 8, and 10.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of transmitting a reference signal to a base station, the method comprising:
   receiving a configuration message from the base station, wherein the configuration message comprises an indication of a set of candidate resources for transmitting the reference signal;
   detecting a future downlink transmission from the base station; and
   transmitting, in response to detecting the future downlink transmission, the reference signal utilizing a first resource of the set of candidate resources prior to receiving the future downlink transmission via a second resource in the set of candidate resources.

2. The method of claim 1, wherein the reference signal comprises one or more of a sounding reference signal (SRS) or a channel state information (CSI) signal.

3. The method of claim 1, wherein detecting the future downlink transmission comprises detecting a downlink resource grant for the future downlink transmission.

4. The method of claim 1, further comprising transmitting, to the base station, a radio resource control (RRC) message signal indicating an autonomous reference signal capability, and receiving the configuration message in response to the RRC message signal.

5. The method of claim 1, wherein detecting the future downlink transmission is in part based on the configuration message, wherein the configuration message indicates a semi-persistent scheduling (SPS) of downlink grants, and wherein the set of candidate resources comprise resources allocated for downlink grants according to the SPS of downlink grants.

6. The method of claim 1, wherein the configuration message is received via one or more of a radio resource control (RRC) message or downlink control information (DCI) for the future downlink transmission.

7. The method of claim 1, wherein the set of candidate resources comprise one or more of an uplink slot resource or an index of symbols within the uplink slot resource.

8. The method of claim 1, wherein the future downlink transmission is a retransmission of a first downlink transmission.

9. The method of claim 8, wherein detecting the future downlink transmission from the base station comprises:

determining that the base station will perform the retransmission based on a downlink decoding failure of the first downlink transmission; and transmitting a negative-acknowledgement (NAK) to the base station in response to the downlink decoding failure.

10. The method of claim 8, further comprising determining the set of candidate resources based at least in part on one or more of the indication of the set of candidate resources, or a resource of the first downlink transmission.

11. The method of claim 1, wherein the first resource of the set of candidate resources comprises an uplink-centric slot.

12. The method of claim 1, wherein the reference signal comprises a channel state information (CSI) report, and wherein the method further comprises:
estimating a signal to interference plus noise ratio (SINR) for the future downlink transmission from the base station; and
generating the CSI report based in part on the estimated SINR.

13. The method of claim 1, wherein the reference signal comprises a channel state information (CSI) report, and wherein the method further comprises:
generating the CSI report based in part on one or more of a signal to interference plus noise ratio (SINR) for a previous downlink transmission, or a signal-to-leakage ratio for the previous downlink transmission.

14. The method of claim 1, wherein the configuration message includes downlink configuration information (DCI) comprising the indication of the set of candidate resources for transmitting the reference signal, and wherein the set of candidate resources include one or more resource blocks (RBs) of a physical uplink shared channel (PUSCH) or one or more RBs of a physical downlink shared channel (PDSCH).

15. A user equipment (UE), comprising:
a memory; and
a processor communicatively coupled to the memory, the processor configured to:
receive a configuration message from a base station, wherein the configuration message comprises an indication of a set of candidate resources for transmitting a reference signal;
detect a future downlink transmission from the base station; and
transmit, in response to detecting the future downlink transmission, the reference signal utilizing a first resource of the set of candidate resources prior to receiving the future downlink transmission via a second resource in the set of candidate resources.

16. The UE of claim 15, wherein the reference signal comprises one or more of a sounding reference signal (SRS) or a channel state information (CSI) signal.

17. The UE of claim 15, wherein the processor, being configure to detect the future downlink transmission, is further configured to detect a downlink resource grant for the future downlink transmission.

18. The UE of claim 15, wherein the processor is further configured to:
transmit, to the base station, a radio resource control (RRC) message signal indicating an autonomous reference signal capability; and
receive the configuration message in response to the RRC message signal.

19. The UE of claim 15, wherein the processor is further configured to detect the future downlink transmission based in part on the configuration message, wherein the configuration message indicates a semi-persistent scheduling (SPS) of downlink grants, and wherein the set of candidate resources comprise resources allocated for downlink grants according to the SPS of downlink grants.

20. The UE of claim 15, wherein the configuration message comprises one or more of a radio resource control (RRC) message or downlink control information (DCI) for the future downlink transmission.

21. The UE of claim 15, wherein the set of candidate resources comprise one or more of an uplink slot resource or an index of symbols within the uplink slot resource.

22. The UE of claim 15, wherein the future downlink transmission is a retransmission of a first downlink transmission.

23. The UE of claim 22, wherein the processor, being configured to detect the future downlink transmission from the base station, is further configured to:
determine that the base station will perform the retransmission based on a downlink decoding failure of the first downlink transmission; and
transmit a negative-acknowledgement (NAK) to the base station in response to the downlink decoding failure.

24. The UE of claim 22, wherein the processor is further configured to determine the set of candidate resources based at least in part on one or more of the indication of the set of candidate resources or a resource of the first downlink transmission.

25. The UE of claim 15, wherein the first resource of the set of candidate resources comprises an uplink-centric slot.

26. The UE of claim 15, wherein the reference signal comprises a channel state information (CSI) report, and wherein the processor is further configured to:
estimate a signal to interference plus noise ratio (SINR) for the future downlink transmission from the base station; and
generate the CSI report based in part on the estimated SINR.

27. A user equipment (UE), comprising:
means for receiving a configuration message from a base station, wherein the configuration message comprises an indication of a set of candidate resources for transmitting a reference signal;
means for detecting a future downlink transmission from the base station; and
means for transmitting, in response to detecting the future downlink transmission, the reference signal utilizing a first resource of the set of candidate resources prior to receiving the future downlink transmission via a second resource in the set of candidate resources.

28. The UE of claim 27, wherein the reference signal comprises one or more of a sounding reference signal (SRS) or a channel state information (CSI) signal.

29. A non-transitory computer-readable storage medium that stores instructions that when executed by a user equipment (UE) cause the UE to perform a method of transmitting a reference signal from the UE to a base station, the method comprising:
receiving a configuration message from the base station, wherein the configuration message comprises an indication of a set of candidate resources for transmitting the reference signal;
detecting a future downlink transmission from the base station; and
transmitting, in response to detecting the future downlink transmission, the reference signal utilizing a first resource of the set of candidate resources prior to receiving the future downlink transmission via a second resource in the set of candidate resources.

30. The non-transitory computer-readable storage medium of claim 29, wherein the reference signal comprises one or more of a sounding reference signal (SRS) or a channel state information (CSI) signal.

\* \* \* \* \*